(12) United States Patent
Clark et al.

(10) Patent No.: US 7,530,068 B2
(45) Date of Patent: May 5, 2009

(54) METHOD OF RESOURCE ALLOCATION USING AN ACCESS CONTROL MECHANISM

(75) Inventors: Scott Douglas Clark, Rochester, MN (US); Michael Norman Day, Round Rock, TX (US); Charles Ray Johns, Austin, TX (US); Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 10/738,720

(22) Filed: Dec. 17, 2003

(65) Prior Publication Data

US 2005/0138621 A1    Jun. 23, 2005

(51) Int. Cl.
*G06F 9/46* (2006.01)
(52) U.S. Cl. ..................... 718/100; 718/104
(58) Field of Classification Search ................ 718/104, 718/100
See application file for complete search history.

(56) References Cited

U.S. PATENT DOCUMENTS

| | | | |
|---|---|---|---|
| 4,491,946 A | 1/1985 | Kryskow, Jr. et al. | |
| 4,819,229 A | 4/1989 | Pritty et al. | |
| 4,864,491 A | 9/1989 | Ohuchi | |
| 4,930,121 A | 5/1990 | Shiobara | |
| 5,367,679 A | 11/1994 | Khaira | |
| 5,388,223 A | 2/1995 | Guthrie et al. | |
| 5,434,861 A | 7/1995 | Pritty et al. | |
| 6,073,132 A | 6/2000 | Gehman | |
| 6,325,293 B1 | 12/2001 | Moreno | |
| 6,522,628 B1 * | 2/2003 | Patel et al. | 370/230.1 |
| 6,714,553 B1 | 3/2004 | Poole et al. | |
| 6,907,491 B2 | 6/2005 | Moss | |
| 6,996,647 B2 | 2/2006 | Raghavan et al. | |
| 7,051,135 B2 | 5/2006 | Zhu | |
| 2003/0219028 A1 * | 11/2003 | Peyravian et al. | 370/439 |

OTHER PUBLICATIONS

U.S. Appl. No. 11/260,579, filed Oct. 27, 2005, Chen et al.
Zhang et al., "Token ring arbitration circuits for dynamic priority algorithms", (abstract only), Publication date: Aug. 3-5, 1994, 2 pages.

* cited by examiner

*Primary Examiner*—Thomas Lee
*Assistant Examiner*—Camquy Truong
(74) *Attorney, Agent, or Firm*—Francis Lammas; Stephen J. Walder, Jr.; Matthew B. Tatpis

(57) ABSTRACT

A method and apparatus are provided for efficiently managing limited resources is a given computer system. The system utilizes a token manager that assigns tokens to groups of associated requestors. The tokens are then utilized by the requesters to occupy the given resource. The allocation of these tokens, thus, prevents such problems as denial of service due to a lack of available resources.

1 Claim, 4 Drawing Sheets

METHOD OF RESOURCE ALLOCATION USING AN ACCESS CONTROL MECHANISM

CROSS-REFERENCED APPLICATIONS

This application relates to U.S. patent applications entitled "TOKEN SWAPPING FOR HOT SPOT MANAGEMENT" (U.S. Pat. No. 6,996,647, issued Feb. 7, 2006), filed concurrently herewith.

BACKGROUND OF THE INVENTION

1. Field of the Invention

The present invention relates generally to management of resources within a computing system and, more particularly, managing access to a resource to provide a guaranteed availability while maintaining high utilization of the resources.

2. Description of the Related Art

Within a given computer architecture, such as a Broadband Engine or a large SMP system, there exists a finite number of resources, such as processors, memory, I/O devices and interconnect buses that are available for use. In the current art resource management systems such as operating systems, hypervisors or virtual machine layers allocate processors, memory and I/O devices to specific tasks for specific periods of time, typically using a time-sliced approach based on task priorities and resource requirements. However, these management systems do not actively manage the interconnect buses that connect and provide access to the resources. This lack of bus resource management can significantly limit the capability to provide a "guaranteed" utilization of a resource during a specific period of time due to delay of access, particularly where there are multiple processors, memory and I/O devices sharing common buses concurrently executing multiple tasks. For instance, in a case where there are two tasks concurrently running on two different processors, accessing two different banks of memory, one tasks completion time can be adversely affected by the bus utilization and access patterns of the second task, even though to the resource management facility, both tasks have dedicated processor and memory resources. Techniques such as dropping packets of information and retrying operations are typically used for management of over committed resources in networking applications. However, these techniques do not work in systems having time critical tasks because of the retry delays and inherent inefficiencies.

Time slicing and partitioning of processors, I/O and memory with priority arbitration schemes lack access controls for the resources needed for real-time applications and usage when there are a plurality of these resources attached to shared buses. Essentially, applications or tasks can easily congest a bus or a memory leading to stalls, retires, long lag times, and overall poor performance even though the management system properly provided the processor, memory or I/O resource to the task. Some of the major problems as a result of applications or tasks overrunning a system are bottlenecks and denial of service. A scheme, which allocates the bus for a task at a specific time, typically provides very poor overall utilization of system resources thus introducing considerable inefficiency.

Therefore, there is a need for a method and/or apparatus for controlling the usage and access to resources in a system executing concurrent tasks which addresses the problem of resource access using shared resources that addresses at least some of the problems associated with conventional methods and apparatuses for controlling usage and access to resources in a system executing concurrent tasks.

SUMMARY OF THE INVENTION

The present invention provides for managing system resources. There are a plurality of managed resources and a plurality of requesters that at least request and at least utilize the managed resources with a pending request. Associated with the requesters are a plurality of resource allocation groups, wherein requestors are assigned to a group based on a resource usage characteristic. A local bus that at least allows for communication and data transfer between the plurality of requestors and the plurality of managed resources is also provided. There is also a token manager that at least controls the usage of the managed resources.

BRIEF DESCRIPTION OF THE DRAWINGS

For a more complete understanding of the present invention, and its advantages, references will now be made in the following Detailed Description to the accompanying drawings, in which.

DETAILED DESCRIPTION OF THE INVENTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by hardware, such as a computer or an electronic data processor, in accordance with code, such as computer program code, software, and/or integrated circuits that are coded to perform such functions, unless indicated otherwise.

Moreover, it should be further noted that the method and apparatus described is based on operation at a system level. However, a similar device and/or methodology can be implemented at a network level through mechanisms such as Quality of Service.

Figure 1:
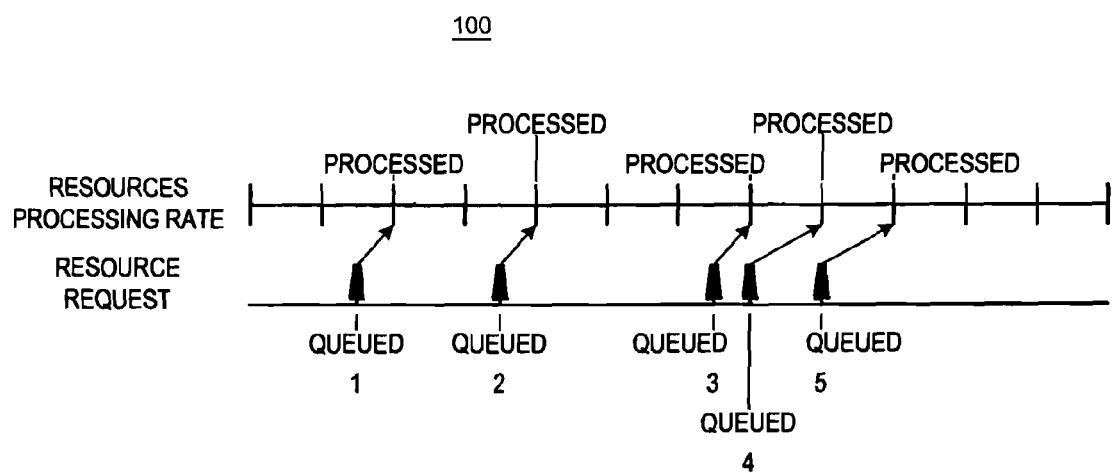
FIG. 1 is an illustration of unrestricted request of a resource.

Referring to FIG. 1 of the drawings, the reference numeral 100 generally designates an illustration of unrestricted request of a resource.

Normally, with an unmanaged system as illustrated in the timing diagram in FIG. 1, there can be problems caused by the occupation of resources resulting in denial of service through stalls and retires as mentioned above. For the sake of simplicity and illustration, FIG. 1 is an example of a 1-deep request queue, which is one requester, such as a Direct Memory Access (DMA) unit. At times 1 and 2, there is only a single request for a resource with ample time and availability to process the request. However, at time 3, a request is pending, but before the request can be processed, another request is queued at time 4. Thus, the request at time 4 is stalled, or possibly retired, as illustrated as shaded. As a further example, while the request at time 4 is pending, a fifth request is queued at time 5. This fifth request is also stalled, or possibly retired, as illustrated as shaded. These delays result in bottlenecks or denials of service.

Figure 2:
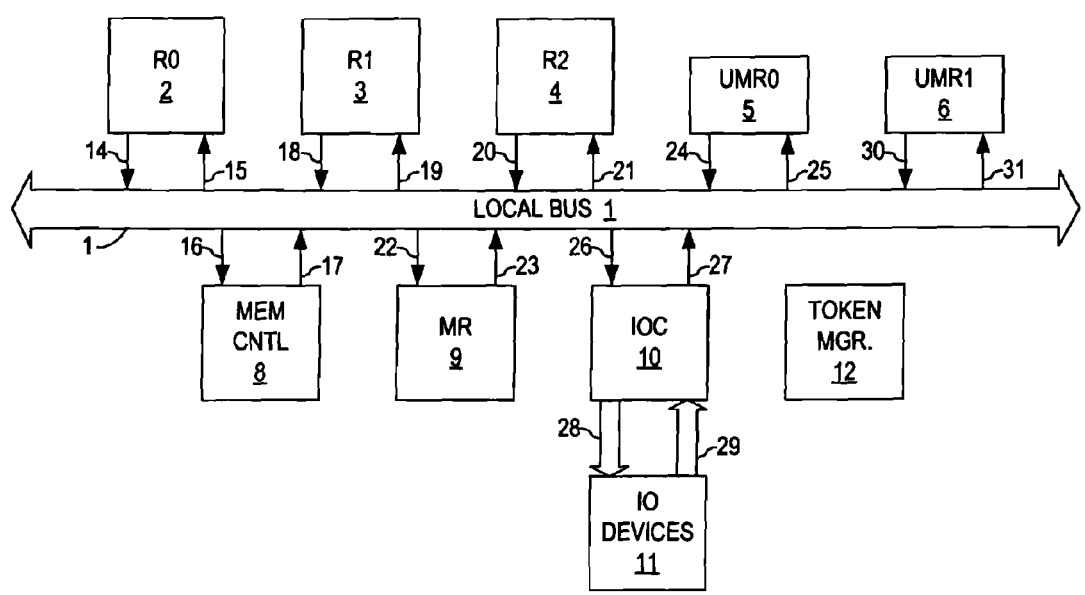
FIG. 2 is a block diagram of a system structure utilizing a token manager.

Referring to FIG. 2 of the drawings, the reference numeral 200 generally designates a block diagram of a system structure utilizing a token manager.

FIG. 2 is an illustration of a system structure 200 to alleviate the problems of denial of service and bottlenecks. Denials of service, delays, and bottlenecks are as a result of requestors, such as a Direct Memory Access (DMA) unit, or groups of requesters blocking other requesters from accessing a given resource. For example, a DMA unit occupying an IO device and not allowing any other processor to utilize the IO device is a denial of service. In FIG. 2, there are multiple requestors and multiple resources that each interact through a connection with a local bus 1.

The requestors are labeled R0 2, R1 3, R2 4, and IOC (I/O Controller) 10 for four given requestors. The requestors are devices, such as an IOC 10 or a DMA unit, that request usage of managed resources, such as IO devices, and unmanaged resources, such as Synchronous Dynamic Random Access Memory (SDRAM). There can be one or more requestors of varying types. For example, an IO controller 10 acts as a requestor and a managed resource, where R0 2 is a requestor only.

Each of the requestors is further connected through a communication channel to the local bus 1. R0 2 is connected to the local bus 1 through a first communication channel 14 and a second communication channel 15. R1 3 is connected to the local bus 1 through a third communication channel 18 and a fourth communication channel 19. R2 4 is connected to the local bus 1 through a fifth communication channel 20 and a sixth communication channel 21. IOC is connected to the local bus 1 through a seventh communication channel 26 and an eighth communication channel 27. Each requestor will have at least one or more communication channels connected to a given local bus that operates in a variety of manners. Moreover, any of the aforementioned communications channels would encompass wireless links, optical links, conductor cable links, packet switched channels, direct communication channels and any combination thereof.

The unmanaged resources are labeled UMR0 5 and UMR1 6 for two given unmanaged resources. There can be one or more unmanaged resources of a variety of types. An example of what can be an unmanaged resource is SDRAM where there typically cannot be an occupation of the resource by a single or small group of requesters or is typically not shared by multiple requesters.

Each of the unmanaged resources is further connected through a communication channel to the local bus 1. UMR0 5 is connected to the local bus 1 through a ninth communication channel 24 and a tenth communication channel 25. UMR1 6 is connected to the local bus 1 through an eleventh communication channel 30 and a twelfth communication channel 31. Each unmanaged resource will have at least one or more communication channels connected to a given local bus that operates in a variety of manners. Moreover, any of the aforementioned communications channels would encompass wireless links, optical links, conductor cable links, packet switched channels, direct communication channels and any combination thereof.

Typically, resources that relate to critical bottlenecks are managed. There can be one or more managed resources. The managed resources illustrated are labeled as follows: Memory controller (Mem Cntl) as 8, Managed Resource (MR) as 9, IO Controller (IOC) as 10, and IO devices as 11. The managed resources are examples and illustrations of resources that can be used. The immediate disclosure as limiting the number or type of managed resources.

There are a variety of interfaces between the managed resources and the local bus 1. The Mem Cntl 8 is connected to the local bus 1 through thirteenth communication channel 16 and a fourteenth communication channel 17. MR 9 is connected to the local bus 1 through a fifteenth communication channel 22 and a sixteenth communication channel 23. IOC 10 is connected to the local bus 1 through the seventh communication channel 26 and the eighth communication channel 27. It should be noted that the IOC 10 is a unique mechanism that operates as both a requestor and a managed resource. However, there are a multitude of other mechanisms that possess similar properties to the IOC 10. The use of an IOC 10 is for the purposes of example and illustration and should not be read to limit. Finally, IO device 11 is connected to the local bus 1 through a sixteenth communication channel 28, a seventeenth communication channel 29, the seventh communication channel 26, and the eighth communication channel 27. One should also note that the IO device 11 is further under the control of the IOC 10. Thus, the seventh communication channel 26 and the eighth communication channel 27 of the IOC 10 are also be utilized. However, there are a multitude of other mechanisms that possess similar properties to the IO devices 11 and the IOC 10. The use of IO devices 11 and the IOC 10 is for the purposes of example and illustration and should not be read to limit. Also, each managed resource will have at least one or more communication channels connected to a given local bus that operates in a variety of manners.

Moreover, certain paths of usage between the requestors and the managed resources have special designations. These paths are designated as Management Paths (MP). Most paths are multitude of communication channels and the local bus 1 that interconnect the requestors to the managed resources. For example, the first communication channel 14, the local bus 1, and the fifteenth communication channel 22 comprise an MP between the R0 2 and MR 9. The significance of the MPs are that a token is used for a communication across the given MP.

The Token Manager 12 also solves the problems of denial of service and bottlenecks. Each requestor is assigned a Resource Allocation ID (RAID), which is stored in a register and which is typically related to its access characteristics. Requestors with the same RAID are referred to as a Resource Allocation Group (RAGs). The token manager 12 allocates the usage for each managed resources for a given RAG. The characteristics of the RAGs are determined by software, which can be dynamic. Essentially, each RAG is allocated a predetermined percentage of bandwidth by software, which is based on the desired system performance. In order for a requester within a RAG to communicate with or utilize a given managed resource through an MP, a token should be granted, by the token manager, to the requestor that allows for the communication or utilization. Without a token, there can be no communication or utilization of a managed resource across the MP.

Regarding the tokens, the Token Manager 12 does not arbitrarily assign the tokens. The Token Manager, instead, generates resource tokens for each RAG by virtue of a rate counter. A given requestor, though, cannot accumulate the tokens, and the sum of all rates for all of the RAGs must not exceed the capabilities of the resource.

However, in certain cases, such as IO devices 11, multiple MPs are required for communication with a resource. For example, when an IO device 11 accesses memory (not shown), there is both an IO Controller (IOC) 11 and a Memory Controller (Mem Cntl) 8 required to complete the transfer. Hence, for such a transfer, there is a requirement of two tokens, one for each Managed Resource (i.e. the IO Controller and Memory Controller). Thus, tokens can be accumulated to complete a single task or communication in special cases wherein multiple tokens are required to perform a single task or communication, such as with I/O devices.

The requester can utilize the tokens and initiate the communication. A requestor should first generate an internal token request for usage, which includes both a RAID and Managed Resource. The token request is then forwarded to the Token Manager. Upon reception of the given request, the Token Manager will grant the requested token. When all tokens for the MP are granted, the requester is then allowed to perform the pending request.

However, there can be times when the given RAG does not have a requester with a pending request for the available managed resource. At these specified times, a token can be granted to a requester in another RAG or go unused.

Figure 3:
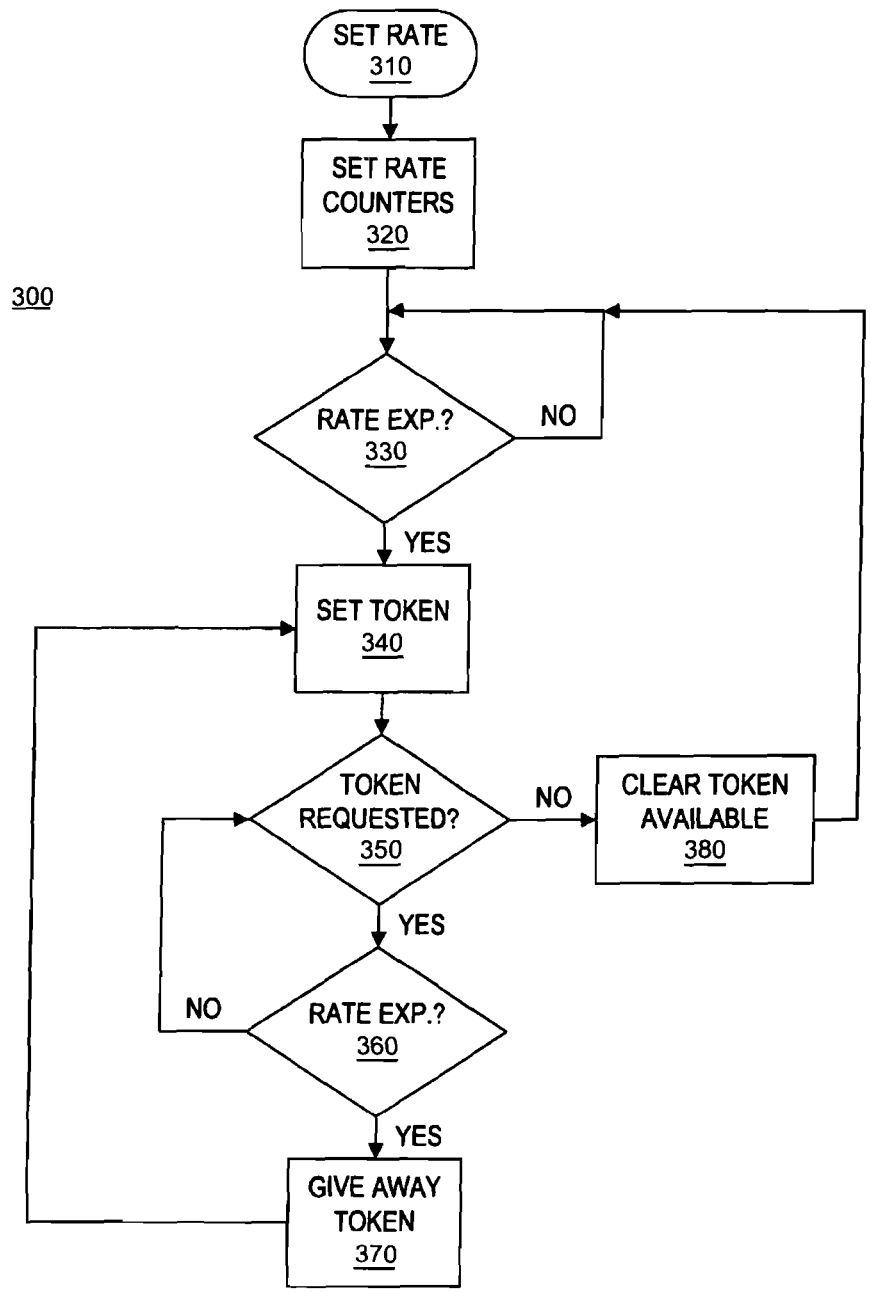
FIG. 3 is a flow chart describing the token availability process.

Referring to FIG. 3 of the drawings, the reference numeral 300 generally designates a flow chart describing the token availability process.

In order to cross-grant tokens, the Token Manager should make a determination of availability as illustrated in FIG. 3. In step 310 and 320, the Token Manager 12 of FIG. 2 sets the rate and starts the rate counter. In step 330, once the rate counter is started, there is a determination as to whether the rate has expired. In step 340, upon expiration, the available tokens are set. In step 350, there is a determination as to whether there is a token request. In step 380, if there is a token request, the token is made available, and the Token Manager 12 of FIG. 2 again waits until the rate has expired 330. If there is not a token request, the Token Manager 12 of FIG. 2 waits until the rate has expired 360. Once the rate has expired, the token is given away 370, and the available tokens are set 340.

Furthermore, there are also situations where there are unallocated tokens. In other words, there can be tokens that have no particular assignment to a RAG. These unallocated tokens can also be available to requesters with pending requests. However, to obtain the unallocated tokens, the procedure for availability is identical to the procedure illustrated in FIG. 3, and a requestor with a pending request must simply wait for a token, either unused or unallocated, to become available.

Figure 4:
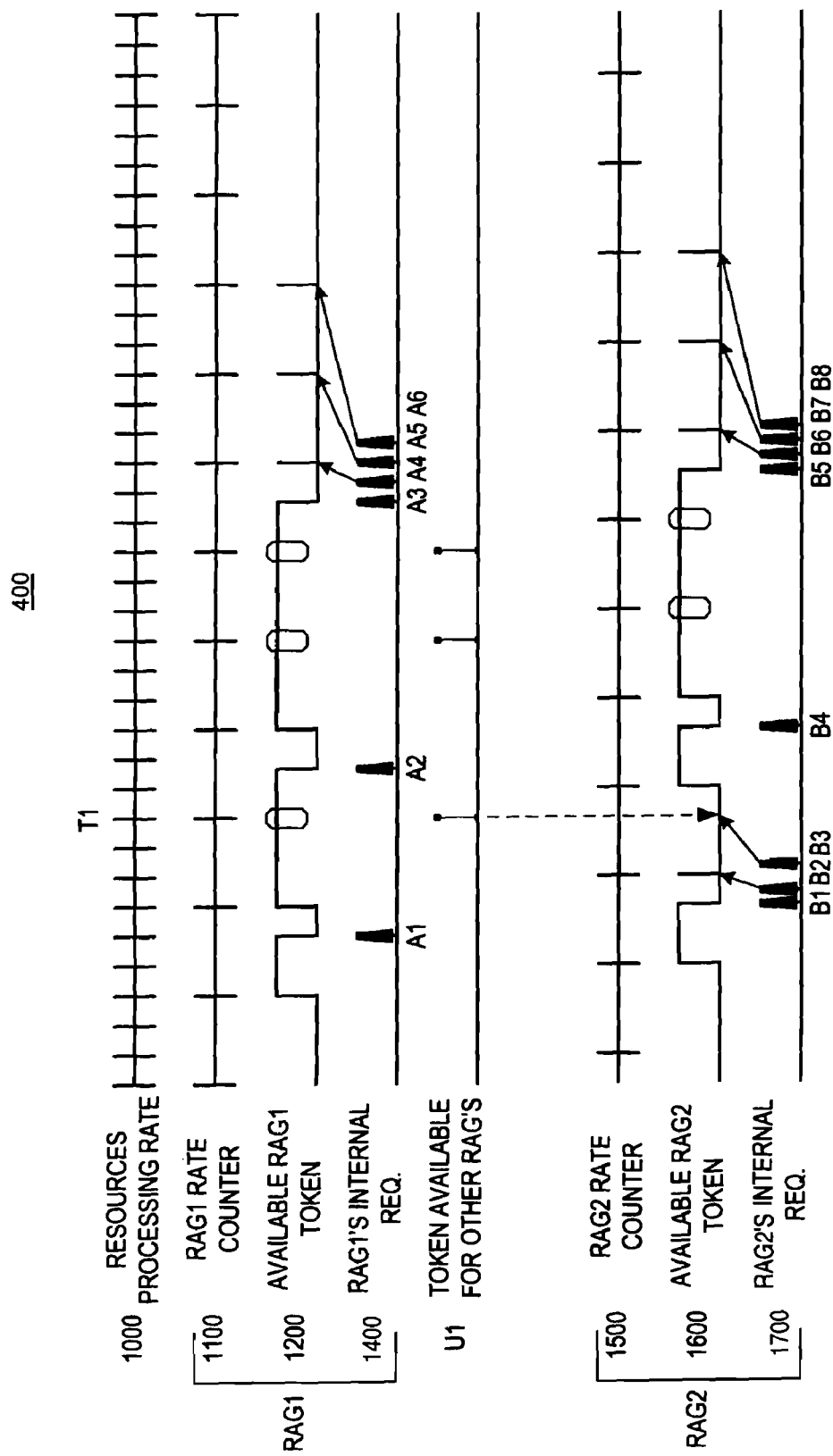
FIG. 4 is an example of granting an unused token.

Referring to FIG. 4 of the drawings, the reference numeral 400 generally designates an illustration of example of cross granting of an unused token. FIG. 4 is to be used for the purposes of example and illustration. There may be one or more RAGs utilized with a given process rate based on the desired performance and capabilities of the system. Moreover, there are at least one or more tokens that each RAG utilizes.

Overall, there is a rate at which resources are processed 1000. For both RAG1 and RAG2, there are respective rate counters, 1100 and 1500, respective token availability, 1200 and 1600, and respective internal requests, 1400 and 1700. Also, the internal requests for RAG1 are labeled A1 to A6, and the internal requests for RAG2 are labeled B1 to B8. One should note that at time T1 a token is available for RAG 1, but there is no pending request in RAG2. However, there is a pending request at T1 within RAG2. Hence, the token is cross-granted from RAG1 to RAG2 U1.

Hence, the use of a Token Manager in the present invention allows for the preservation of the allocation, which prevents denial of service. By using a Token Manager for the generation and allocation of tokens, bandwidth is guaranteed. Also, resources are utilized to the maximum extend, so as to prevent waste.

It will be understood from the foregoing description that various modifications and changes can be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for managing system resources, comprising:

assigning each requestor in a plurality of requestors to an associated resource allocation group in a plurality of resource allocation groups based on resource usage characteristics of each requestor, wherein each resource allocation group in the plurality of resource allocation groups comprises two or more requestors;

setting a rate counter for each resource allocation group based on the resource usage characteristics of the requestors within each resource allocation group, thereby forming a set of rate counters, wherein each rate counter in the set of rate counters tracks a rate that is a percentage of bandwidth for a managed resource that can be used by the requestors in each resource allocation group;

generating for each resource allocation group a plurality of tokens for the managed resource based on the rate counter, wherein a sum of all rates for the set of rate counters for the plurality of resource allocation groups does not exceed the capabilities of the managed resource;

receiving a first request for a first token from a requestor in a first resource allocation group of the plurality of resource allocation groups;

responsive to receiving the first request, determining whether one of the plurality of tokens generated for the first resource allocation group for the managed resource is available to fill the request;

responsive to one of the plurality of tokens generated for the first allocation group for the managed resource being available, issuing the token generated for the first allocation group for the managed resource to the requestor receiving a second request for a second token from the requestor in the first resource allocation group;

responsive to receiving the second request, determining whether another one of the plurality of tokens generated for the first resource allocation group for the managed resource is available to fill the request;

responsive to another one of the plurality of tokens generated for the first allocation group for the managed resource failing to be available, determining whether one of the plurality of tokens generated for a second resource allocation group of the plurality of resource allocation groups for the managed resource is available to fill the request; and responsive to one of the plurality of tokens generated for the second allocation group for the managed resource being available, issuing the token generated for the second allocation group for the managed resource to the requestor.

* * * * *